(12) United States Patent
Benedict et al.

(10) Patent No.: US 10,281,177 B2
(45) Date of Patent: May 7, 2019

(54) CALORIC HEAT PUMP SYSTEM

(71) Applicant: Haier US Appliance Solutions, Inc., Wilmington, DE (US)

(72) Inventors: Michael Alexander Benedict, Louisville, KY (US); Michael Goodman Schroeder, Lousiville, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 79 days.

(21) Appl. No.: 15/213,442

(22) Filed: Jul. 19, 2016

(65) Prior Publication Data
US 2018/0023851 A1    Jan. 25, 2018

(51) Int. Cl.
*F25B 21/00*    (2006.01)
*F25D 11/02*    (2006.01)

(52) U.S. Cl.
CPC ............ *F25B 21/00* (2013.01); *F25D 11/025* (2013.01); *F25B 2321/0021* (2013.01); *Y02B 30/66* (2013.01)

(58) Field of Classification Search
CPC ... F25B 21/00; F25B 2321/0021; F25D 11/02
See application file for complete search history.

(56) References Cited

U.S. PATENT DOCUMENTS

| | | |
|---|---|---|
| 668,560 A | 2/1901 | Fulner et al. |
| 1,985,455 A | 12/1934 | Mosby |
| 2,671,929 A * | 3/1954 | Gayler ............... D01D 5/20 264/167 |
| 2,765,633 A | 10/1956 | Muffly |
| 3,816,029 A | 6/1974 | Bowen et al. |
| 3,956,076 A | 5/1976 | Powell, Jr. et al. |
| 4,037,427 A | 7/1977 | Kramer |
| 4,102,655 A | 7/1978 | Jeffery et al. |
| 4,107,935 A | 8/1978 | Steyert, Jr. |
| 4,197,709 A | 4/1980 | Hochstein |
| 4,200,680 A | 4/1980 | Sasazawa et al. |
| 4,259,843 A | 4/1981 | Kausch |
| 4,507,927 A | 4/1985 | Barclay |
| 4,507,928 A | 4/1985 | Johnson |
| 4,549,155 A | 10/1985 | Halbach |

(Continued)

FOREIGN PATENT DOCUMENTS

| | | |
|---|---|---|
| CA | 2893874 A1 | 6/2014 |
| CA | 2919117 A1 | 1/2015 |

(Continued)

OTHER PUBLICATIONS

International Search Report and Written Opinion issued in connection with PCT Application No. PCT/US2014/042485 dated Oct. 31, 2014.

(Continued)

*Primary Examiner* — Kun Kai Ma
(74) *Attorney, Agent, or Firm* — Dority & Manning, P.A.

(57) ABSTRACT

A caloric heat pump system includes a motor and a pair of non-circular gears meshed with each other. A first one of the pair of non-circular gears is coupled to a regenerator housing, and a second one of the pair of non-circular gears is coupled to the motor. The regenerator housing is rotatable with the motor through the pair of non-circular gears.

8 Claims, 8 Drawing Sheets

(56) References Cited

U.S. PATENT DOCUMENTS

| | | |
|---|---|---|
| 4,554,790 A | 11/1985 | Nakagome et al. |
| 4,557,228 A | 12/1985 | Samodovitz |
| 4,599,866 A * | 7/1986 | Nakagome .............. F25B 21/00 505/889 |
| 4,625,519 A | 12/1986 | Hakuraku et al. |
| 4,642,994 A | 2/1987 | Barclay et al. |
| 4,785,636 A | 11/1988 | Hakuraku et al. |
| 4,796,430 A | 1/1989 | Malaker et al. |
| 5,091,361 A | 2/1992 | Hed |
| 5,156,003 A | 10/1992 | Yoshiro et al. |
| 5,249,424 A | 10/1993 | DeGregoria et al. |
| 5,336,421 A | 8/1994 | Kurita et al. |
| 5,351,791 A | 10/1994 | Rosenzweig |
| 5,465,781 A | 11/1995 | DeGregoria |
| 5,599,177 A | 2/1997 | Hetherington |
| 5,661,895 A | 9/1997 | Irgens |
| 5,718,570 A | 2/1998 | Beckett et al. |
| 5,934,078 A | 8/1999 | Lawton, Jr. et al. |
| 6,332,323 B1 | 12/2001 | Reid et al. |
| 6,423,255 B1 | 7/2002 | Hoechsmann et al. |
| 6,446,441 B1 | 9/2002 | Dean |
| 6,526,759 B2 | 3/2003 | Zimm et al. |
| 6,588,215 B1 | 7/2003 | Ghoshal |
| 6,612,816 B1 | 9/2003 | Vanden Brande et al. |
| 6,668,560 B2 | 12/2003 | Zimm et al. |
| 6,826,915 B2 | 12/2004 | Wada et al. |
| 6,915,647 B2 | 7/2005 | Tsuchikawa et al. |
| 6,935,121 B2 | 8/2005 | Fang et al. |
| 6,946,941 B2 | 9/2005 | Chell |
| 6,971,245 B2 | 12/2005 | Kuroyanagi |
| 7,148,777 B2 | 12/2006 | Chell et al. |
| 7,297,270 B2 | 11/2007 | Bernard et al. |
| 7,313,926 B2 | 1/2008 | Gurin |
| 7,481,064 B2 | 1/2009 | Kitanovski et al. |
| 7,552,592 B2 | 6/2009 | Iwasaki et al. |
| 7,644,588 B2 | 1/2010 | Shin |
| 7,863,789 B2 | 1/2011 | Zepp et al. |
| 7,897,898 B2 | 3/2011 | Muller et al. |
| 7,938,632 B2 | 5/2011 | Smith |
| 8,061,147 B2 | 11/2011 | Dinesen et al. |
| 8,069,662 B1 | 12/2011 | Albert |
| 8,099,964 B2 | 1/2012 | Saito et al. |
| 8,174,245 B2 | 5/2012 | Carver |
| 8,191,375 B2 | 6/2012 | Sari et al. |
| 8,209,988 B2 | 7/2012 | Zhang et al. |
| 8,216,396 B2 | 7/2012 | Dooley et al. |
| 8,310,325 B2 | 11/2012 | Zhang et al. |
| 8,375,727 B2 | 2/2013 | Sohn |
| 8,378,769 B2 | 2/2013 | Heitzler et al. |
| 8,448,453 B2 | 5/2013 | Bahl et al. |
| 8,551,210 B2 | 10/2013 | Reppel et al. |
| 8,596,084 B2 | 12/2013 | Herrera et al. |
| 8,616,009 B2 | 12/2013 | Dinesen et al. |
| 8,656,725 B2 | 2/2014 | Muller et al. |
| 8,695,354 B2 | 4/2014 | Heitzler et al. |
| 8,729,718 B2 | 5/2014 | Kuo et al. |
| 8,763,407 B2 | 7/2014 | Carroll et al. |
| 8,769,966 B2 | 7/2014 | Heitzler et al. |
| 8,869,541 B2 | 10/2014 | Heitzler et al. |
| 8,904,806 B2 | 12/2014 | Cramet et al. |
| 8,935,927 B2 | 1/2015 | Kobayashi et al. |
| 9,175,885 B2 | 11/2015 | Katter |
| 9,245,673 B2 | 1/2016 | Carroll et al. |
| 9,377,221 B2 | 6/2016 | Benedict |
| 9,400,126 B2 | 7/2016 | Takahashi et al. |
| 9,523,519 B2 | 12/2016 | Muller |
| 9,534,817 B2 | 1/2017 | Benedict et al. |
| 9,548,151 B2 | 1/2017 | Muller |
| 9,599,374 B2 | 3/2017 | Takahashi et al. |
| 9,631,843 B2 | 4/2017 | Benedict |
| 9,702,594 B2 | 7/2017 | Vetrovec |
| 9,739,510 B2 | 8/2017 | Hassen |
| 9,797,630 B2 | 10/2017 | Benedict et al. |
| 9,810,454 B2 | 11/2017 | Tasaki et al. |
| 9,857,105 B1 | 1/2018 | Schroeder et al. |
| 9,857,106 B1 | 1/2018 | Schroeder et al. |
| 9,927,155 B2 | 3/2018 | Boeder et al. |
| 9,978,487 B2 | 5/2018 | Katter et al. |
| 10,006,675 B2 | 6/2018 | Benedict et al. |
| 10,018,385 B2 | 7/2018 | Radermacher et al. |
| 2002/0040583 A1 | 4/2002 | Barclay et al. |
| 2002/0066368 A1 | 6/2002 | Zornes |
| 2003/0010054 A1 | 1/2003 | Esch et al. |
| 2003/0051774 A1 | 3/2003 | Saito |
| 2004/0093877 A1 | 5/2004 | Wada |
| 2004/0182086 A1 | 9/2004 | Chiang et al. |
| 2004/0187803 A1 * | 9/2004 | Regev .................... F01C 1/077 123/18 A |
| 2004/0250550 A1 | 12/2004 | Bruck |
| 2005/0109490 A1 | 5/2005 | Harmon et al. |
| 2005/0274676 A1 | 12/2005 | Kumar et al. |
| 2006/0231163 A1 | 10/2006 | Hirosawa et al. |
| 2007/0130960 A1 | 6/2007 | Muller et al. |
| 2007/0220901 A1 | 9/2007 | Kobayashi |
| 2008/0236171 A1 | 10/2008 | Saito et al. |
| 2008/0303375 A1 | 12/2008 | Carver |
| 2009/0091411 A1 | 4/2009 | Zhang et al. |
| 2009/0158749 A1 | 6/2009 | Sandeman |
| 2009/0217674 A1 | 9/2009 | Kaji et al. |
| 2009/0236930 A1 | 9/2009 | Nashiki |
| 2009/0266083 A1 | 10/2009 | Shin et al. |
| 2009/0308080 A1 | 12/2009 | Han et al. |
| 2010/0000228 A1 | 1/2010 | Wiest et al. |
| 2010/0058775 A1 | 3/2010 | Kaji et al. |
| 2010/0071383 A1 | 3/2010 | Zhang et al. |
| 2010/0116471 A1 | 5/2010 | Reppel |
| 2010/0122488 A1 | 5/2010 | Fukai |
| 2010/0209084 A1 | 8/2010 | Nelson et al. |
| 2010/0236258 A1 | 9/2010 | Heitzler et al. |
| 2010/0276627 A1 | 11/2010 | Mazet |
| 2010/0303917 A1 | 12/2010 | Watson et al. |
| 2011/0000206 A1 | 1/2011 | Aprad |
| 2011/0042608 A1 | 2/2011 | Reesink |
| 2011/0048031 A1 | 3/2011 | Barve |
| 2011/0048690 A1 | 3/2011 | Reppel et al. |
| 2011/0058795 A1 | 3/2011 | Kleman et al. |
| 2011/0062821 A1 | 3/2011 | Chang et al. |
| 2011/0082026 A1 | 4/2011 | Sakatani et al. |
| 2011/0162388 A1 | 7/2011 | Barve et al. |
| 2011/0168363 A9 | 7/2011 | Reppel et al. |
| 2011/0173993 A1 | 7/2011 | Muller et al. |
| 2011/0182086 A1 | 7/2011 | Mienko et al. |
| 2011/0192836 A1 | 8/2011 | Muller et al. |
| 2011/0218921 A1 | 9/2011 | Addala et al. |
| 2011/0239662 A1 | 10/2011 | Bahl et al. |
| 2011/0284196 A1 | 11/2011 | Zanadi |
| 2011/0302931 A1 | 12/2011 | Sohn |
| 2011/0308258 A1 | 12/2011 | Smith et al. |
| 2012/0031108 A1 | 2/2012 | Kobayashi et al. |
| 2012/0033002 A1 | 2/2012 | Seeler et al. |
| 2012/0036868 A1 | 2/2012 | Heitzler et al. |
| 2012/0045698 A1 | 2/2012 | Shima |
| 2012/0079834 A1 | 4/2012 | Dinesen |
| 2012/0222427 A1 | 9/2012 | Hassen |
| 2012/0222428 A1 | 9/2012 | Celik et al. |
| 2012/0266591 A1 | 10/2012 | Morimoto et al. |
| 2012/0266607 A1 | 10/2012 | Morimoto et al. |
| 2012/0267090 A1 | 10/2012 | Kruglick |
| 2012/0272665 A1 | 11/2012 | Watanabe et al. |
| 2012/0272666 A1 | 11/2012 | Watanabe |
| 2012/0285179 A1 | 11/2012 | Morimoto |
| 2012/0291453 A1 | 11/2012 | Watanabe et al. |
| 2013/0019610 A1 | 1/2013 | Zimm et al. |
| 2013/0020529 A1 | 1/2013 | Chang et al. |
| 2013/0104568 A1 | 5/2013 | Kuo et al. |
| 2013/0106116 A1 | 5/2013 | Kuo et al. |
| 2013/0145573 A1 | 6/2013 | Bizhanzadeh |
| 2013/0180263 A1 | 7/2013 | Choi et al. |
| 2013/0186107 A1 | 7/2013 | Shih et al. |
| 2013/0187077 A1 | 7/2013 | Katter |
| 2013/0192269 A1 | 8/2013 | Wang |
| 2013/0199460 A1 | 8/2013 | Duplessis et al. |
| 2013/0227965 A1 | 9/2013 | Yagi et al. |
| 2013/0232993 A1 | 9/2013 | Saito et al. |

(56) References Cited

U.S. PATENT DOCUMENTS

| | | |
|---|---|---|
| 2013/0255279 A1 | 10/2013 | Tomimatsu et al. |
| 2013/0269367 A1 | 10/2013 | Meillan |
| 2013/0298571 A1 | 11/2013 | Morimoto et al. |
| 2013/0300243 A1 | 11/2013 | Gieras et al. |
| 2013/0319012 A1 | 12/2013 | Kuo et al. |
| 2013/0327062 A1 | 12/2013 | Watanabe et al. |
| 2014/0020881 A1 | 1/2014 | Reppel et al. |
| 2014/0075958 A1 | 3/2014 | Takahashi et al. |
| 2014/0116538 A1 | 5/2014 | Tanaka et al. |
| 2014/0165594 A1 | 6/2014 | Benedict |
| 2014/0165595 A1* | 6/2014 | Zimm ............... F25B 21/00 62/3.1 |
| 2014/0190182 A1 | 7/2014 | Benedict |
| 2014/0216057 A1 | 8/2014 | Oezcan |
| 2014/0260373 A1 | 9/2014 | Gerber et al. |
| 2014/0290273 A1 | 10/2014 | Benedict et al. |
| 2014/0290275 A1 | 10/2014 | Muller |
| 2014/0291570 A1 | 10/2014 | Klausner et al. |
| 2014/0305137 A1 | 10/2014 | Benedict |
| 2014/0305139 A1 | 10/2014 | Takahashi et al. |
| 2014/0325996 A1 | 11/2014 | Muller |
| 2014/0366557 A1 | 12/2014 | Mun et al. |
| 2015/0007582 A1 | 1/2015 | Kim et al. |
| 2015/0027133 A1 | 1/2015 | Benedict |
| 2015/0030483 A1 | 1/2015 | Ryu |
| 2015/0033762 A1 | 2/2015 | Cheng et al. |
| 2015/0033763 A1 | 2/2015 | Saito et al. |
| 2015/0047371 A1 | 2/2015 | Hu et al. |
| 2015/0068219 A1 | 3/2015 | Komorowski et al. |
| 2015/0089960 A1 | 4/2015 | Takahashi et al. |
| 2015/0114007 A1 | 4/2015 | Neilson et al. |
| 2015/0168030 A1 | 6/2015 | Leonard et al. |
| 2015/0211440 A1 | 7/2015 | Joffroy |
| 2015/0260433 A1 | 9/2015 | Choi et al. |
| 2015/0267943 A1 | 9/2015 | Kim et al. |
| 2015/0362225 A1 | 12/2015 | Schwartz |
| 2015/0369524 A1 | 12/2015 | Ikegami et al. |
| 2016/0000999 A1 | 1/2016 | Focht et al. |
| 2016/0084544 A1 | 3/2016 | Radermacher et al. |
| 2016/0091227 A1 | 3/2016 | Leonard et al. |
| 2016/0238287 A1 | 8/2016 | Benedict |
| 2016/0282021 A1 | 9/2016 | Zhao et al. |
| 2016/0355898 A1 | 12/2016 | Vieyra Villegas et al. |
| 2016/0356529 A1 | 12/2016 | Humburg |
| 2016/0367982 A1 | 12/2016 | Pennie |
| 2017/0059213 A1 | 3/2017 | Barclay et al. |
| 2017/0071234 A1 | 3/2017 | Garg |
| 2017/0138648 A1 | 5/2017 | Cui et al. |
| 2017/0328603 A1 | 11/2017 | Barclay et al. |
| 2017/0328649 A1 | 11/2017 | Brandmeier |
| 2017/0370624 A1 | 12/2017 | Zimm et al. |
| 2018/0005735 A1 | 1/2018 | Scharf et al. |

FOREIGN PATENT DOCUMENTS

| | | |
|---|---|---|
| CN | 101979937 | 10/2010 |
| CN | 101979937 A | 2/2011 |
| CN | 201772566 U | 3/2011 |
| CN | 101788207 B | 9/2011 |
| CN | 202432596 U | 9/2012 |
| CN | 103090583 A | 5/2013 |
| CN | 103712401 A | 4/2014 |
| CN | 102077303 B | 4/2015 |
| CN | 106481842 A | 3/2017 |
| DE | 102013223959 A1 | 5/2015 |
| DE | 202015106851 U1 | 3/2016 |
| EP | 2071255 A1 | 6/2009 |
| EP | 2108904 A1 | 10/2009 |
| EP | 2215955 A1 | 8/2010 |
| EP | 2322072 A2 | 5/2011 |
| EP | 3306082 A2 | 4/2018 |
| FR | 2935468 A1 | 3/2010 |
| JP | 59232922 | 12/1984 |
| JP | H08166182 A | 6/1996 |
| JP | 3205196 B2 | 9/2001 |
| JP | 2002315243 A | 10/2002 |
| JP | 2007147136 A | 6/2007 |
| JP | 2007291437 A | 11/2007 |
| JP | 2008051412 A | 3/2008 |
| JP | 2010112606 A | 5/2010 |
| JP | 2010525291 A | 7/2010 |
| JP | 6212955 B2 | 12/2014 |
| JP | 2014228216 A | 12/2014 |
| JP | 6079498 B2 | 2/2017 |
| JP | 2017207222 A | 11/2017 |
| KR | 101100301 B1 | 12/2011 |
| KR | 1238234 B1 | 3/2013 |
| WO | WO0212800 A1 | 2/2002 |
| WO | WO03016794 A1 | 2/2003 |
| WO | WO2004/068512 | 8/2004 |
| WO | WO2007/036729 A1 | 4/2007 |
| WO | WO2009/024412 | 2/2009 |
| WO | WO2010/119591 A1 | 10/2010 |
| WO | WO2011034594 A1 | 3/2011 |
| WO | WO2014099199 A1 | 6/2014 |
| WO | WO2014170447 A1 | 10/2014 |
| WO | WO2014173787 A1 | 10/2014 |
| WO | WO2015017230 A1 | 2/2015 |
| WO | WO2016035267 A1 | 3/2016 |
| WO | WO2017042266 A1 | 3/2017 |
| WO | WO2017097989 A1 | 6/2017 |

OTHER PUBLICATIONS

International Search Report and Written Opinion issued in connection with PCT Application No. PCT/US2014/017431 dated May 16, 2014.

International search report issued in connection with PCT/US2013/070518, dated Jan. 30, 2014.

Tetsuji Okamura, Performance of a room-temperature rotary magnet refrigerator, dated Nov. 28, 2005, Elsevier.

Barbara Pulko, Epoxy-bonded La—Fe—Co—Si magnetocaloric plates, Journal of Magnetism and Magnetic Materials, 375 (2015) 65-73.

Journal of Alloys and Compounds, copyright 2008 Elsevier B..V. Evaluation of Ni—Mn—In—Si Alloys for Magnetic Refrigerant Application, Rahul Das, A. Perumal and A. Srinivasan, Dept of Physics, Indian Institute of Technology, Oct. 10, 2011.

Effects of annealing on the magnetic entropy change and exchange bias behavior in melt-spun Ni—Mn—In ribbons, X.Z. Zhao, C.C. Hsieh, et al Science Direct, Scripta Materialia 63 (2010).

PCT International Search Report dated Mar. 6, 2014.

International Search Report of PCT/US2014/047925 dated Nov. 10, 2014.

Andrej Kitanovski, Present and future caloric refrigeration and heat-pump technologies, International Journal of Refrigeration, vol. 57, Sep. 2015, pp. 288-298.

C Aprea, et al., An innovative rotary permanent magnet magnetic refrigerator based on AMR cycle, Thermal Energy Systems: Production, Storage, Utilization and the Environment, dated May 2015, Napoli, Italy, pp. 1-5.

* cited by examiner

CALORIC HEAT PUMP SYSTEM

FIELD OF THE INVENTION

The subject matter of the present disclosure relates generally to caloric heat pump systems, such as magneto-caloric heat pump systems.

BACKGROUND OF THE INVENTION

Conventional refrigeration technology typically utilizes a heat pump that relies on compression and expansion of a fluid refrigerant to receive and reject heat in a cyclic manner so as to effect a desired temperature change or i.e. transfer heat energy from one location to another. This cycle can be used to provide e.g., for the receiving of heat from a refrigeration compartment and the rejecting of such heat to the environment or a location that is external to the compartment. Other applications include air conditioning of residential or commercial structures. A variety of different fluid refrigerants have been developed that can be used with the heat pump in such systems.

While improvements have been made to such heat pump systems that rely on the compression of fluid refrigerant, at best such can still only operate at about forty-five percent or less of the maximum theoretical Carnot cycle efficiency. Also, some fluid refrigerants have been discontinued due to environmental concerns. The range of ambient temperatures over which certain refrigerant-based systems can operate may be impractical for certain locations. Other challenges with heat pumps that use a fluid refrigerant exist as well.

Magneto-caloric materials (MCMs), i.e. materials that exhibit the magneto-caloric effect, provide a potential alternative to fluid refrigerants for heat pump applications. In general, the magnetic moments of an MCM will become more ordered under an increasing, externally applied magnetic field and cause the MCM to generate heat. Conversely, decreasing the externally applied magnetic field will allow the magnetic moments of the MCM to become more disordered and allow the MCM to absorb heat. Some MCMs exhibit the opposite behavior, i.e. generating heat when the magnetic field is removed (which are sometimes referred to as para-magneto-caloric material but both types are referred to collectively herein as magneto-caloric material or MCM). The theoretical Carnot cycle efficiency of a refrigeration cycle based on an MCM can be significantly higher than for a comparable refrigeration cycle based on a fluid refrigerant. As such, a heat pump system that can effectively use an MCM would be useful.

Challenges exist to the practical and cost competitive use of an MCM, however. In addition to the development of suitable MCMs, equipment that can attractively utilize an MCM is still needed. Currently proposed equipment may require relatively large and expensive magnets, may be impractical for use in e.g., appliance refrigeration, and may not otherwise operate with enough efficiency to justify capital cost.

Accordingly, a heat pump system that can address certain challenges, such as those identified above, would be useful. Such a heat pump system that can also be used in e.g., a refrigerator appliance would also be useful.

BRIEF DESCRIPTION OF THE INVENTION

The present subject matter provides a caloric heat pump system with a motor and a pair of non-circular gears meshed with each other. A first one of the pair of non-circular gears is coupled to a regenerator housing, and a second one of the pair of non-circular gears is coupled to the motor. The regenerator housing is rotatable with the motor through the pair of non-circular gears. Additional aspects and advantages of the invention will be set forth in part in the following description, or may be apparent from the description, or may be learned through practice of the invention.

In a first exemplary embodiment, a caloric heat pump system is provided. The caloric heat pump system includes a regenerator housing defining a chamber. The caloric heat pump system also includes a motor and a pair of non-circular gears meshed with each other. A first one of the pair of non-circular gears is coupled to the regenerator housing, and a second one of the pair of non-circular gears is coupled to the motor. The regenerator housing is rotatable with the motor through the pair of non-circular gears. A stage includes a caloric material positioned within the chamber of the regenerator housing. A field generator is positioned proximate to the regenerator housing. The field generator is positioned so that the stage is moved in and out of a field from the field generator as the regenerator housing rotates relative to the field generator.

In a second exemplary embodiment, a caloric heat pump system is provided. The caloric heat pump system includes a regenerator housing that defines a chamber. A stage includes a caloric material positioned within the chamber of the regenerator housing. A field generator is positioned proximate to the regenerator housing. The caloric heat pump system also includes a motor and a pair of non-circular gears meshed with each other. A first one of the pair of non-circular gears is coupled to the field generator, and a second one of the pair of non-circular gears is coupled to the motor. The field generator is rotatable with the motor through the pair of non-circular gears. The regenerator housing is positioned so that a field from the field generator moves relative to the stage as the field generator rotates relative to the regenerator housing.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

DETAILED DESCRIPTION

Figure 1:
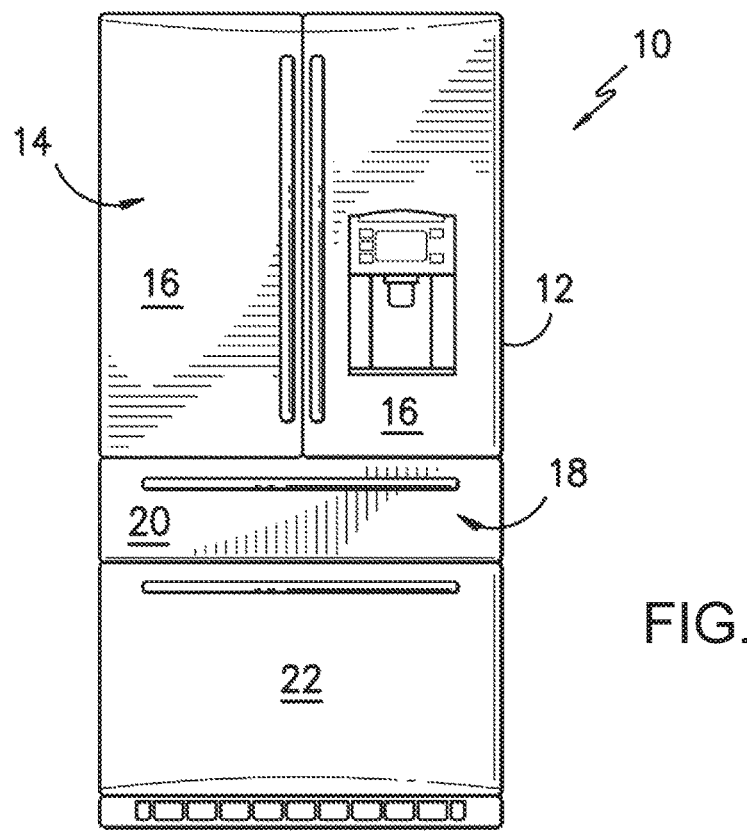
FIG. 1 provides a front view of a refrigerator appliance according to an exemplary embodiment of the present subject matter.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

The present subject matter is directed to a caloric heat pump system for heating or cooling an appliance, such as a refrigerator appliance. While described in greater detail below in the context of a magneto-caloric heat pump system, one of skill in the art will recognize that other suitable caloric materials may be used in a similar manner to heat or cool an appliance, i.e., apply a field, move heat, remove the field, move heat. For example, electro-caloric material heats up and cools down within increasing and decreasing electric fields. As another example, elasto-caloric material heats up and cools down when exposed to increasing and decreasing mechanical strain. As yet another example, baro-caloric material heats up and cools down when exposed to increasing and decreasing pressure. Such materials and other similar caloric materials may be used in place of or in addition to the magneto-caloric material described below to heat or cool water within an appliance. Thus, caloric material is used broadly herein to encompass materials that undergo heating or cooling when exposed to a changing field from a field generator, where the field generator may be a magnet, an electric field generator, an actuator for applying mechanical stress or pressure, etc.

Referring now to FIG. 1, an exemplary embodiment of a refrigerator appliance 10 is depicted as an upright refrigerator having a cabinet or casing 12 that defines a number of internal storage compartments or chilled chambers. In particular, refrigerator appliance 10 includes upper fresh-food compartments 14 having doors 16 and lower freezer compartment 18 having upper drawer 20 and lower drawer 22. The drawers 20, 22 are "pull-out" type drawers in that they can be manually moved into and out of the freezer compartment 18 on suitable slide mechanisms. Refrigerator 10 is provided by way of example only. Other configurations for a refrigerator appliance may be used as well including appliances with only freezer compartments, only chilled compartments, or other combinations thereof different from that shown in FIG. 1. In addition, the heat pump and heat pump system of the present subject matter is not limited to appliances and may be used in other applications as well such as e.g., air-conditioning, electronics cooling devices, and others. Thus, it should be understood that while the use of a heat pump to provide cooling within a refrigerator is provided by way of example herein, the present subject matter may also be used to provide for heating applications as well.

Figure 2:
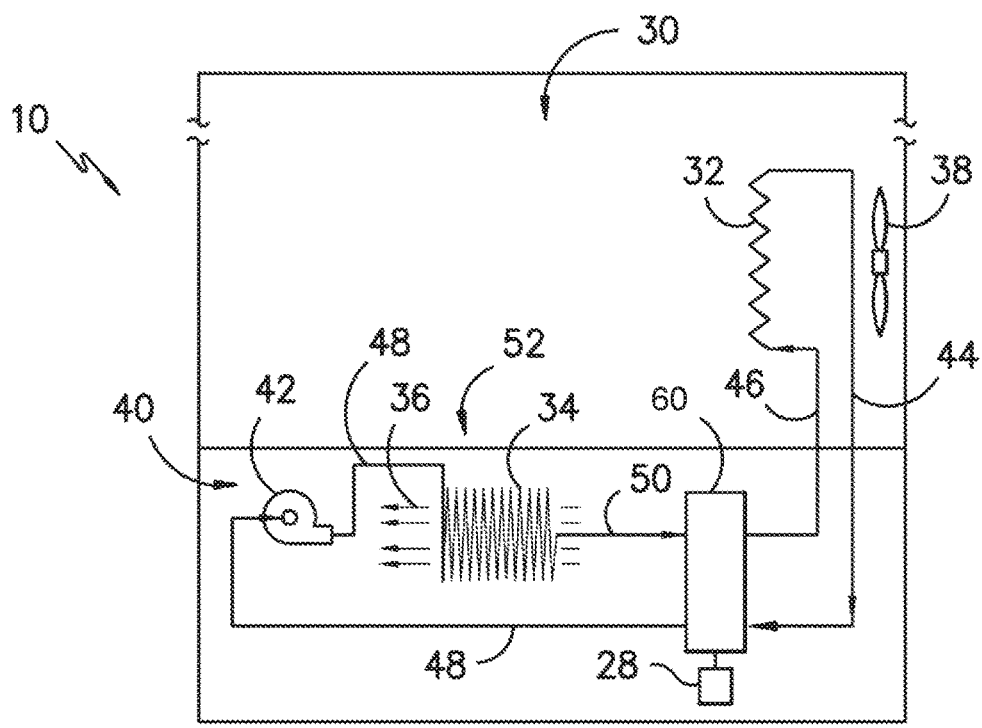
FIG. 2 provides a schematic illustration of certain components of a heat pump system according to an exemplary embodiment of the present subject matter positioned in an exemplary refrigerator appliance.

FIG. 2 is a schematic view of another exemplary embodiment of refrigerator appliance 10 including a refrigeration compartment 30 and a machinery compartment 40. In particular, machinery compartment 30 includes a heat pump system 52 having a first heat exchanger 32 positioned in the refrigeration compartment 30 for the removal of heat therefrom. A heat transfer fluid such as e.g., an aqueous solution or any other gas, liquid, molten metal, magnetic fluid, nano-fluid, etc., flowing within first heat exchanger 32 receives heat from the refrigeration compartment 30 thereby cooling its contents. A fan 38 may be used to provide for a flow of air across first heat exchanger 32 to improve the rate of heat transfer from the refrigeration compartment 30.

The heat transfer fluid flows out of first heat exchanger 32 by line 44 to a heat pump 60. As will be further described herein, the heat transfer fluid receives additional heat from magneto-caloric material (MCM) in heat pump 60 and carries this heat by line 48 to pump 42 and then to second heat exchanger 34. Heat is released to the environment, machinery compartment 40, and/or other location external to refrigeration compartment 30 using second heat exchanger 34. A fan 36 may be used to create a flow of air across second heat exchanger 34 and thereby improve the rate of heat transfer to the environment. Pump 42 connected into line 48 causes the heat transfer fluid to recirculate in heat pump system 52. Motor 28 is in mechanical communication with heat pump 60 as will further described.

From second heat exchanger 34 the heat transfer fluid returns by line 50 to heat pump 60 where, as will be further described below, the heat transfer fluid loses heat to the MCM in heat pump 60. The now colder heat transfer fluid flows by line 46 to first heat exchanger 32 to receive heat from refrigeration compartment 30 and repeat the cycle as just described.

Heat pump system 52 is provided by way of example only. Other configurations of heat pump system 52 may be used as well. For example, lines 44, 46, 48, and 50 provide fluid communication between the various components of the heat pump system 52 but other heat transfer fluid recirculation loops with different lines and connections may also be employed. For example, pump 42 can also be positioned at other locations or on other lines in system 52. Still other configurations of heat pump system 52 may be used as well. Heat pump 60 may be any suitable heat pump with MCM. For example, heat pump 60 may be constructed or arranged in the manner described in U.S. Patent Publication No. 2014/0165594 of Michael Alexander Benedict, which is hereby incorporated by reference in its entirety.

During operation of heat pump 60, MCM may be exposed to a magnetic field, which causes the magnetic moments of the MCM to orient and the MCM to heat as part of the magneto-caloric effect. Ordering of the magnetic field is created and maintained while the MCM is exposed to the magnetic field such that the heat transfer fluid dwelling in the MCM is heated. In turn, the heat transfer fluid heated by the MCM can travel out of heat pump 60 and along line 48 to the second heat exchanger 34. At the same time, heat transfer fluid from first heat exchanger 32 flows into the MCM within heat pump 60 from line 44. Because heat transfer fluid from the first heat exchanger 32 is relatively cooler than the MCM, the MCM will lose heat to the heat transfer fluid.

The MCM may then be moved, completely or substantially, out of magnetic field. The absence or lessening of the magnetic field is such that the magnetic moments of the material become disordered and the MCM absorbs heat as part of the magneto-caloric effect. In turn, the heat transfer fluid dwelling in the MCM is cooled by losing heat to the MCM as the magnetic moments disorder. The heat transfer fluid, now cooled by the MCM, can then travel out of heat pump 60 and along line 46 to the first heat exchanger 32. At the same time, heat transfer fluid from second heat exchanger 34 flows into heat pump 60 from line 50. Because heat transfer fluid from the second heat exchanger 34 is relatively warmer than the MCM, the MCM will lose some of its heat to the heat transfer fluid. The heat transfer fluid now travels along line 46 to the first heat exchanger 32 to receive heat and cool the refrigeration compartment 30. The above described process may be repeated such that heat pump 60 moves MCM into and out of a magnetic field in order to cool refrigeration compartment 30. A motor 28 in mechanical communication with the MCM within heat pump 60 may move the MCM into and out of the magnetic field.

The MCM within heat pump 60 may be constructed from a single magneto-caloric material or may include multiple different magneto-caloric materials. By way of example, appliance 10 may be used in an application where the ambient temperature changes over a substantial range. However, a specific magneto caloric material may exhibit the magneto-caloric effect over only a much narrower temperature range. As such, it may be desirable to use a variety of magneto-caloric materials within a given stage to accommodate the wide range of ambient temperatures over which appliance 10 and/or heat pump 60 may be used.

Figure 5:
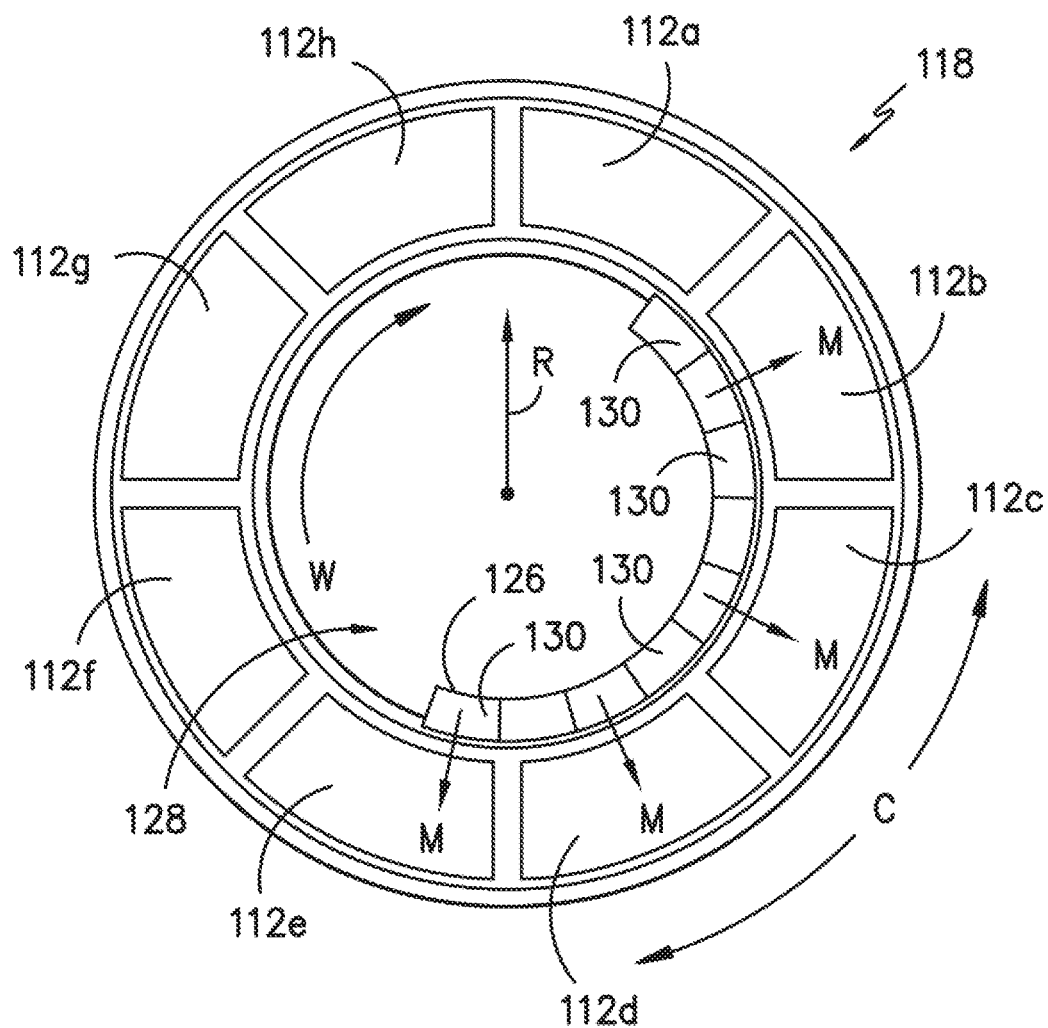
FIG. 5 provides a section view of the exemplary heat pump of FIG. 3.

FIGS. 3, 4, 5, and 6 depict various views of an exemplary heat pump 100 of the present invention. Heat pump 100 includes a regenerator housing 102 that extends longitudinally along an axial direction between a first end 118 and a second end 120. The axial direction is defined by axis A-A about which regenerator housing 102 rotates. A radial direction R is defined by a radius extending orthogonally from the axis of rotation A-A (FIG. 5). A circumferential direction is indicated by arrows C.

Regenerator housing 102 defines a plurality of chambers 104 that extend longitudinally along the axial direction defined by axis A-A. Chambers 104 are positioned proximate or adjacent to each other along circumferential direction C. Each chamber 104 includes a pair of openings 106 and 108 positioned at opposing ends 118 and 120 of regenerator housing 102.

Heat pump 100 also includes a plurality of stages 112 that include MCM. Each stage 112 is located in one of the chambers 104 and extends along the axial direction. For the exemplary embodiment shown in the figures, heat pump 100 includes eight stages 112 positioned adjacent to each other along the circumferential direction as shown and extending longitudinally along the axial direction. As will be understood by one of skill in the art using the teachings disclosed herein, a different number of stages 112 other than eight may be used as well.

A pair of valves 114 and 116 are attached to regenerator housing 102 and rotate therewith along circumferential direction C. More particularly, a first valve 114 is attached to first end 118 and a second valve 116 is attached to second end 120. Each valve 114 and 116 includes a plurality of apertures 122 and 124, respectively. For this exemplary embodiment, apertures 122 and 124 are configured as circumferentially-extending slots that are spaced apart along circumferential direction C. Each aperture 122 is positioned adjacent to a respective opening 106 of a chamber 104. Each aperture 124 is positioned adjacent to a respective opening 108 of a chamber 104. Accordingly, a heat transfer fluid may flow into a chamber 104 through a respective aperture 122 and opening 106 so as to flow through the MCM in a respective stage 112 and then exit through opening 108 and aperture 124. A reverse path can be used for flow of the heat transfer fluid in the opposite direction through the stage 112 of a given chamber 104.

Regenerator housing 102 defines a cavity 128 that is positioned radially inward of the plurality of chambers 104 and extends along the axial direction between first end 118 and second end 120. A magnetic element 126 is positioned within cavity 128 and, for this exemplary embodiment, extends along the axial direction between first end 118 and second end 120. Magnetic element 126 provides a magnetic field that is directed radially outward as indicated by arrows M in FIG. 5.

The positioning and configuration of magnetic element 126 is such that only a subset of the plurality of stages 112 is within magnetic field M at any one time. For example, as shown in FIG. 5, stages 112a and 112e are partially within the magnetic field while stages 112b, 112c, and 112d are fully within the magnetic field M created by magnetic element 126. Conversely, the magnetic element 126 is configured and positioned so that stages 112f, 112g, and 112h are completely or substantially out of the magnetic field created by magnetic element 126. However, as regenerator housing 102 is continuously rotated along the circumferential direction as shown by arrow W, the subset of stages 112 within the magnetic field will continuously change as some stages 112 will enter magnetic field M and others will exit.

A pair of seals 136 and 138 is provided with the seals positioned in an opposing manner at the first end 118 and second end 120 of regenerator housing 102. First seal 136 has a first inlet port 140 and a first outlet port 142 and is positioned adjacent to first valve 114. As shown, ports 140 and 142 are positioned one hundred and eighty degrees apart about the circumferential direction C of first seal 114. However, other configurations may be used. For example, ports 140 and 142 may be positioned within a range of about one hundred and seventy degrees to about one hundred and ninety degrees about the circumferential direction C as well. First valve 114 and regenerator housing 102 are rotatable relative to first seal 136. Ports 140 and 142 are connected with lines 44 and 46 (FIG. 1), respectively. As such, the rotation of regenerator housing 102 about axis A-A sequentially places lines 44 and 46 in fluid communication with at least two stages 112 of MCM at any one time as will be further described.

Second seal 138 has a second inlet port 144 and a second outlet port 146 and is positioned adjacent to second valve 116. As shown, ports 144 and 146 are positioned one hundred and eighty degrees apart about the circumferential direction C of second seal 116. However, other configurations may be used. For example, ports 144 and 146 may be positioned within a range of about one hundred and seventy degrees to about one hundred and ninety degrees about the circumferential direction C as well. Second valve 116 and regenerator housing 102 are rotatable relative to second seal 138. Ports 144 and 146 are connected with lines 50 and 48 (FIG. 1), respectively. As such, the rotation of regenerator housing 102 about axis A-A sequentially places lines 48 and 50 in fluid communication with at least two stages 112 of MCM at any one time as will be further described. Notably, at any one time during rotation of regenerator housing 102, lines 46 and 50 will each be in fluid communication with at least one stage 112 while lines 44 and 48 will also be in fluid communication with at least one other stage 112 located about one hundred and eighty degrees away along the circumferential direction.

Figure 6:
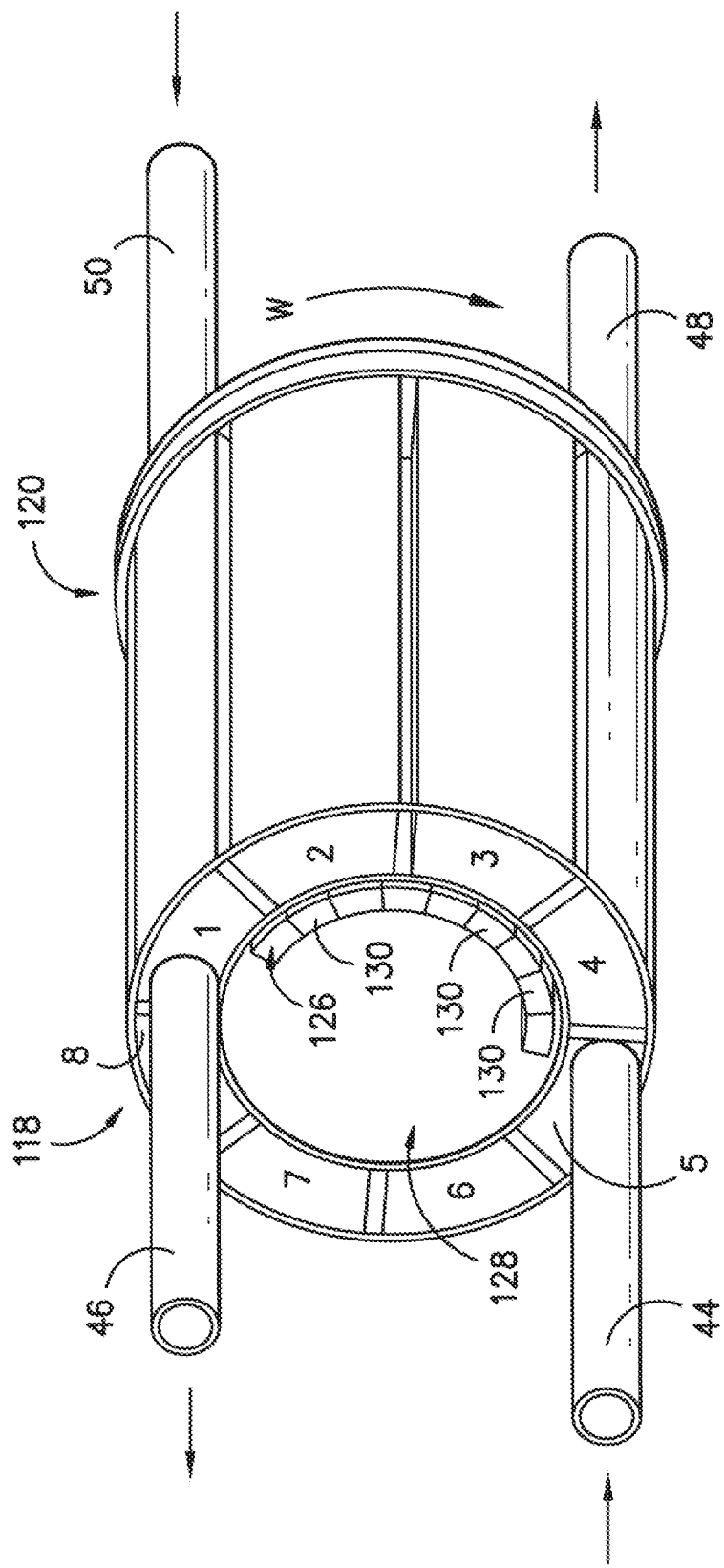
FIG. 6 provides a perspective view of the exemplary heat pump of FIG. 3. Seals located at the ends of a regenerator housing have been removed for purposes of further explanation of this exemplary embodiment of the heat pump as set forth below.
Figure 7:
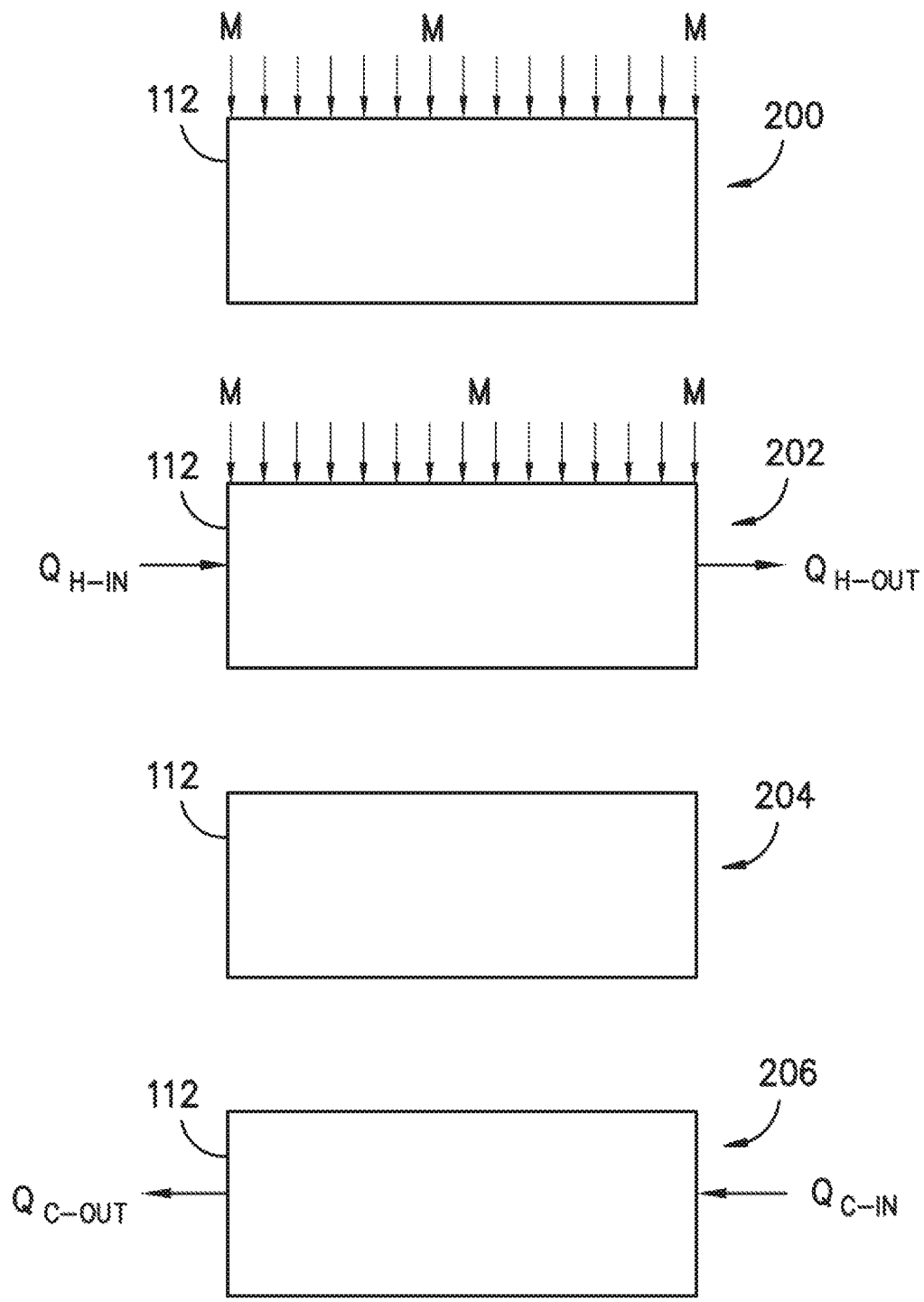
FIG. 7 is a schematic representation of various steps in the use of a stage of the exemplary heat pump of FIG. 3.

FIG. 7 illustrates an exemplary method of the present invention using a schematic representation of stage 112 of MCM in regenerator housing 102 as it rotates in the direction of arrow W between positions 1 through 8 as shown in FIG. 6. During step 200, stage 112 is fully within magnetic field M, which causes the magnetic moments of the material to orient and the MCM to heat as part of the magneto caloric effect. Ordering of the magnetic field is created and maintained as stage 112 is rotated sequentially through positions 2, 3, and then 4 (FIG. 6) as regenerator housing 102 is rotated in the direction of arrow W. During the time at positions 2, 3, and 4, the heat transfer fluid flows in the MCM of stage 112 and, therefore, is heated. More specifically, the heat transfer fluid flows through stage 112 because the openings 106,108, 122, and 124 corresponding to stage 112 in positions 2, 3, and 4 are aligned with the ports 140, 142, 144, or 146. Various alternative combinations of dwelling and pumping of the heat transfer fluid may also be provided.

Figure 3:
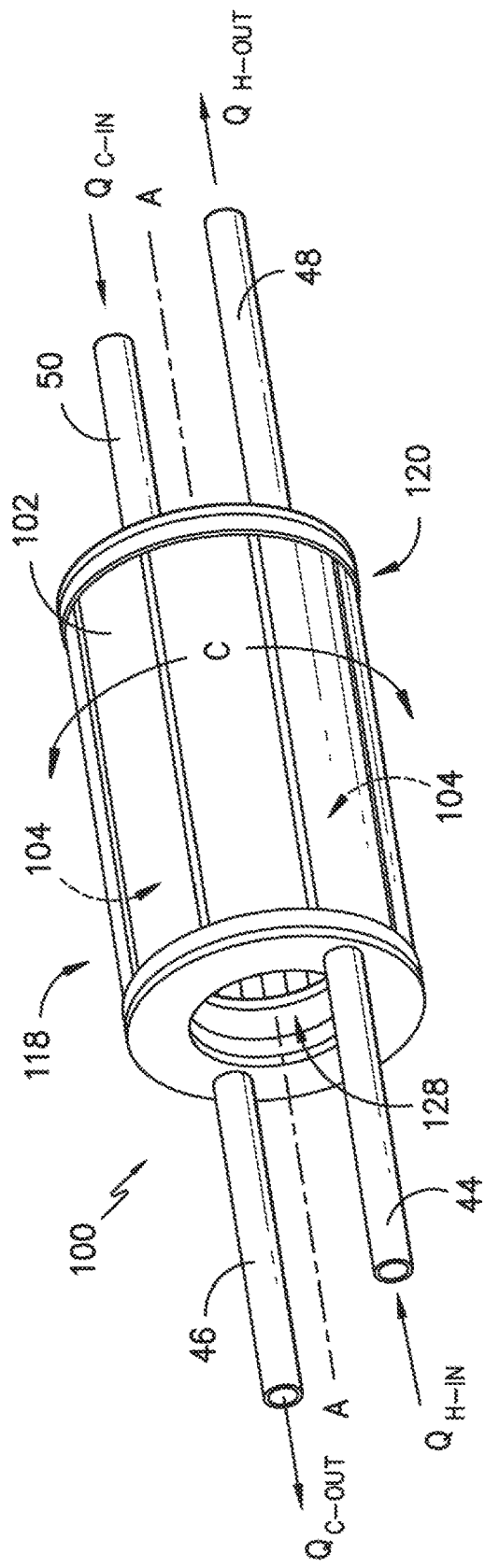
FIG. 3 provides a perspective view of an exemplary heat pump of the present subject matter.
Figure 4:
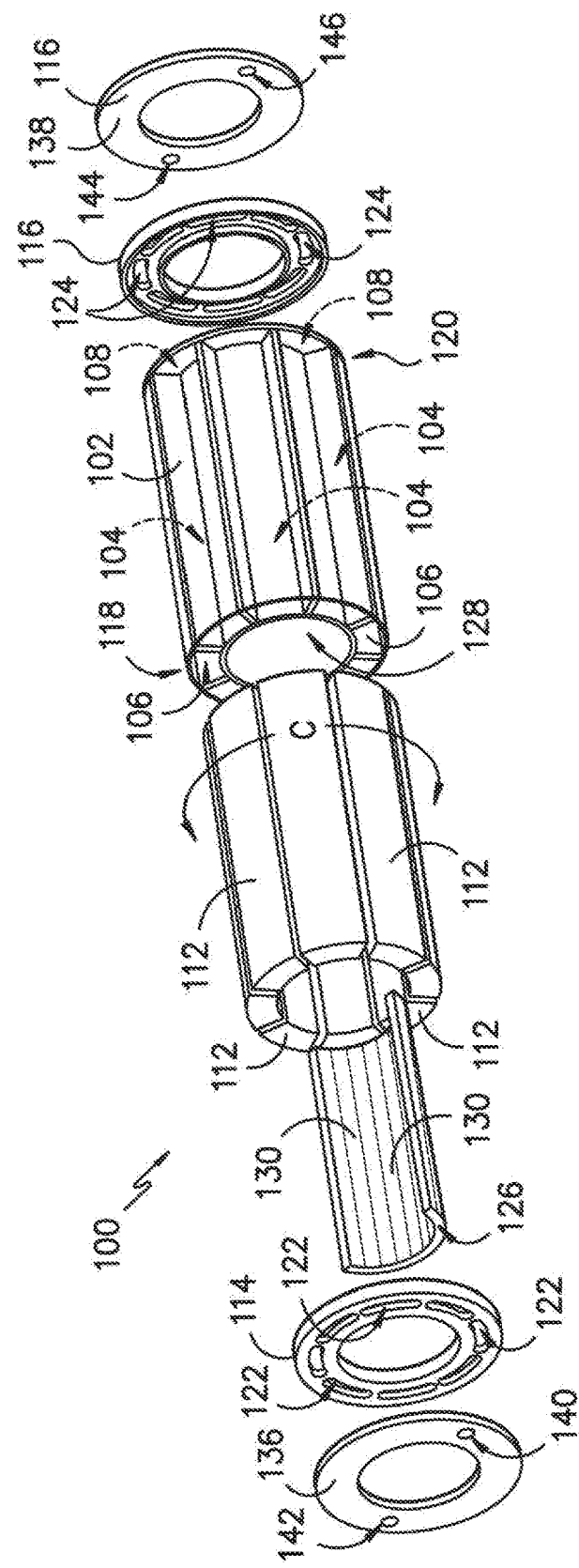
FIG. 4 provides an exploded view of the exemplary heat pump of FIG. 3.

In step 202, as regenerator housing 102 continues to rotate in the direction of arrow W, stage 112 will eventually reach position 5. As shown in FIGS. 3 and 6, at position 5 the heat transfer fluid can flow through the material as first inlet port 140 is now aligned with an opening 122 in first valve 114 and an opening 106 at the first end 118 of stage 112 while second outlet port 146 is aligned with an opening 124 in second valve 116 at the second end 120 of stage 112. As indicated by arrow $Q_{H-OUT}$, heat transfer fluid in stage 112, now heated by the MCM, can travel out of regenerator housing 102 and along line 48 to the second heat exchanger 34. At the same time, and as indicated by arrow $Q_{H-IN}$, heat transfer fluid from first heat exchanger 32 flows into stage 112 from line 44 when stage 112 is at position 5. Because heat transfer fluid from the first heat exchanger 32 is relatively cooler than the MCM in stage 112, the MCM will lose heat to the heat transfer fluid.

Referring again to FIG. 7 and step 204, as regenerator housing 102 continues to rotate in the direction of arrow W, stage 112 is moved sequentially through positions 6, 7, and 8 where stage 112 is completely or substantially out of magnetic field M. The absence or lessening of the magnetic field is such that the magnetic moments of the material become disordered and the MCM absorbs heat as part of the magneto caloric effect. During the time in positions 6, 7, and 8, the heat transfer fluid dwells in the MCM of stage 112 and, therefore, is cooled by losing heat to the MCM as the magnetic moments disorder. More specifically, the heat transfer fluid does not flow through stage 112 because the openings 106, 108, 122, and 124 corresponding to stage 112 when in positions 6, 7, and 8 are not aligned with any of the ports 140, 142, 144, or 146.

Referring to step 206 of FIG. 7, as regenerator housing 102 continues to rotate in the direction of arrow W, stage 112 will eventually reach position 1. As shown in FIGS. 3 and 6, at position 1 the heat transfer fluid in stage 112 can flow through the material as second inlet port 144 is now aligned with an opening 124 in second valve 116 and an opening 108 at the second end 120 while first outlet port 142 is aligned with an opening 122 in first valve 114 and opening 106 at first end 118. As indicated by arrow $Q_{C-OUT}$, heat transfer fluid in stage 112, now cooled by the MCM, can travel out of regenerator housing 102 and along line 46 to the first heat exchanger 32. At the same time, and as indicated by arrow $Q_{C-IN}$, heat transfer fluid from second heat exchanger 34 flows into stage 112 from line 50 when stage 112 is at position 5. Because heat transfer fluid from the second heat exchanger 34 is relatively warmer than the MCM in stage 112 at position 5, the MCM is heated by the heat transfer fluid. The heat transfer fluid now travels along line 46 to the first heat exchanger 32 to receive heat and cool the refrigeration compartment 30.

As regenerator housing 102 is rotated continuously, the above described process of placing stage 112 in and out of magnetic field M is repeated. Additionally, the size of magnetic field M and regenerator housing 102 are such that a subset of the plurality of stages 112 is within the magnetic field at any given time during rotation. Similarly, a subset of the plurality of stages 112 are outside (or substantially outside) of the magnetic field at any given time during rotation. Additionally, at any given time, there are at least two stages 112 through which the heat transfer fluid is flowing while the other stages remain in a dwell mode. More specifically, while one stage 112 is losing heat through the flow of heat transfer fluid at position 5, another stage 112 is receiving heat from the flowing heat transfer fluid at position 1, while all remaining stages 112 are in dwell mode. As such, the system can be operated continuously to provide a continuous recirculation of heat transfer fluid in heat pump system 52 as stages 112 are each sequentially rotated through positions 1 through 8.

As will be understood by one of skill in the art using the teachings disclosed herein, the number of stages for housing 102, the number of ports in valve 114 and 116, and/or other parameters can be varied to provide different configurations of heat pump 100 while still providing for continuous operation. For example, each valve could be provided within two inlet ports and two outlet ports so that heat transfer fluid flows through at least four stages 112 at any particular point in time. Alternatively, regenerator housing 102, valves 122 and 124, and/or seals 136 and 138 could be constructed so that e.g., at least two stages are in fluid communication with an inlet port and outlet port at any one time. Other configurations may be used as well.

As stated, stage 112 includes MCM extending along the axial direction of flow. The MCM may be constructed from a single magneto caloric material or may include multiple different magneto caloric materials. By way of example, appliance 10 may be used in an application where the ambient temperature changes over a substantial range. However, a specific magneto caloric material may exhibit the magneto caloric effect over only a much narrower temperature range. As such, it may be desirable to use a variety of magneto caloric materials within a given stage to accommodate the wide range of ambient temperatures over which appliance 10 and/or heat pump 100 may be used.

A motor 28 is in mechanical communication with regenerator housing 102 and provides for rotation of housing 102 about axis A-A. By way of example, motor 28 may be connected to regenerator housing 102 indirectly through a gear box, as discussed in greater detail below.

Figure 8:
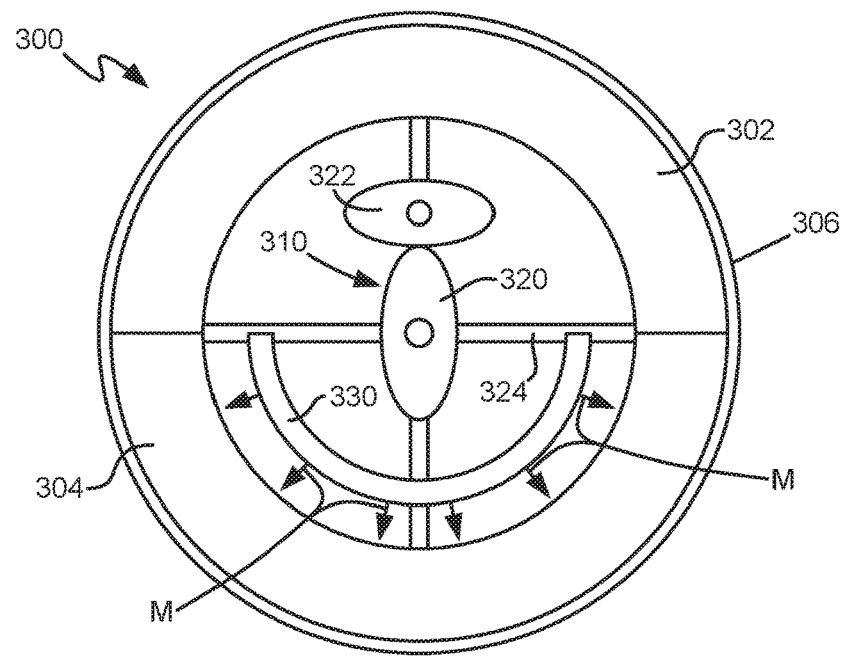
FIG. 8 provides an elevation view of an exemplary heat pump of the present subject matter.

FIG. 8 provides an elevation view of a heat pump 300 according to an exemplary embodiment of the present subject matter. Heat pump 300 is constructed in a similar manner to heat pump 100 (FIG. 3) described above and may operate in a similar manner. As shown in FIG. 8, heat pump 300 includes a magnet 330 and a regenerator housing 306 with two stages, a first stage 302 and a second stage 304, rather than eight stages as with heat pump 100. However, using the teaching herein, one of skill in the art will understand that heat pump 300 may be modified to include any suitable number of stages in alternative exemplary embodiments. For example, heat pump 300 may include only one stage, at least three stages, at least four stages, at least eight stages or more in alternative exemplary embodiments.

Heat pump 300 includes features for rotating stages 302, 304 relative to magnet 330. In particular, heat pump 300 includes a pair of non-circular gears 310, a first gear 320 and a second gear 322. Gears 310 are meshed with each other. In addition, second gear 322 is coupled to motor 28 such that second gear 322 is rotatable with motor 28. For example, second gear 322 may be mounted or fixed to an output shaft of motor 28. First gear 320 is coupled to regenerator housing 306, e.g., via struts 324, such that regenerator housing 306 rotates with first gear 320 during rotation of first gear 320. Because first gear 320 is meshed with second gear 322, motor 28 may rotate regenerator housing 306 through gears 310 during operation of motor 28.

As discussed above, gears 310 are non-circular. Thus, an angular velocity of regenerator housing 306 may not be constant or may vary during operation of motor 28. In particular, regenerator housing 306 may be rotatable with motor 28 through gears 310 such that first stage 302 and second stage 304 are rotated between a proximate position closest to a magnetic field M from magnet 330 and a remote position furthest from the magnetic field M from magnet 330. In FIG. 8, first stage 302 is shown in the proximate position closest to the magnetic field M from magnet 330 while second stage 304 is shown in the remote position furthest from the magnetic field M from magnet 330. Due to shapes of gears 310, first stage 302 and second stage 304 may dwell longer at the proximate and remote positions relative to intermediate positions of the first and second stages 302, 304 between the proximate and remote positions. Such dwelling may increase an efficiency of heat pump 300, e.g., relative to heat pump where first stage 302 and second stage 304 rotates a constant velocity during operation of motor 28. In particular, by spending more time within or out of the magnetic field M from magnet 330, first and second stages 302, 304 may more efficiently transfer heat with fluid therein, e.g., without increasing the size of magnet 330 and thereby increasing a cost of heat pump 300.

Gears 310 may be shaped such that when motor operates to rotate second gear 322 at a constant angular velocity then first gear 320 rotates at a non-constant angular velocity. In particular, the angular velocity of first gear 320 may be slowest when first stage 302 and/or second stage 204 is at the proximate position or the remote position. In certain exemplary embodiments, gears 310 may be shaped such that when motor operates to rotate second gear 322 at a constant angular velocity then first gear 320 rotates at an angular velocity no less than a quarter of the angular velocity of second gear 322 and no greater than four times the angular velocity of second gear 322. In other exemplary embodiments, gears 310 may be shaped such that when motor operates to rotate second gear 322 at a constant angular velocity then first gear 320 rotates at an angular velocity no less than half of the angular velocity of second gear 322 and no greater than twice the angular velocity of second gear 322. Other suitable ratios between the angular velocity of the first and second gears 320, 322 may be provided by suitable shaping gears 310.

Gears 310 may have any suitable non-circular shape, e.g., to provide the varying velocity of first stage 302 and/or second stage 304. As an example, gears 310 may be elliptical gears, as shown in FIG. 8. In alternative exemplary embodiments, gears 310 may be triangular gears, e.g., when heat pump 300 has three stages, square gears, e.g., when heat pump 300 has four stages, etc.

Figure 9:
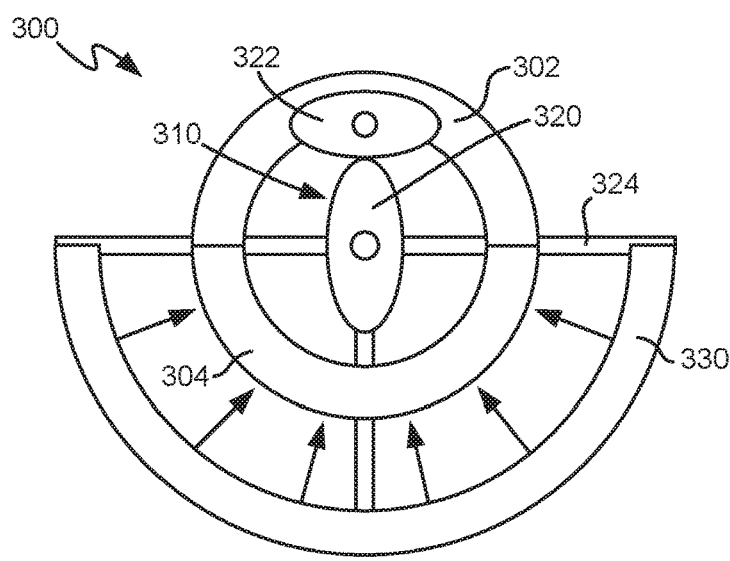
FIG. 9 provides an elevation view of another exemplary heat pump of the present subject matter.

FIG. 9 provides an elevation view of heat pump 300 according to another exemplary embodiment of the present subject matter. As may be seen in FIG. 9, the positions of magnet 330 and first and second stages 302, 304 may be reversed within heat pump 300. Thus, first gear 320 may be coupled to magnet 330, e.g., via struts 324, such that magnet 330 rotates with first gear 320 during rotation of first gear 320. Because first gear 320 is meshed with second gear 322, motor 28 may rotate magnet 330 through gears 310 during operation of motor 28. In the manner described above for regenerator housing 306 in the context of FIG. 8, an angular velocity of magnet 330 may not be constant or may vary during operation of motor 28 due to gears 310.

Figure 10:
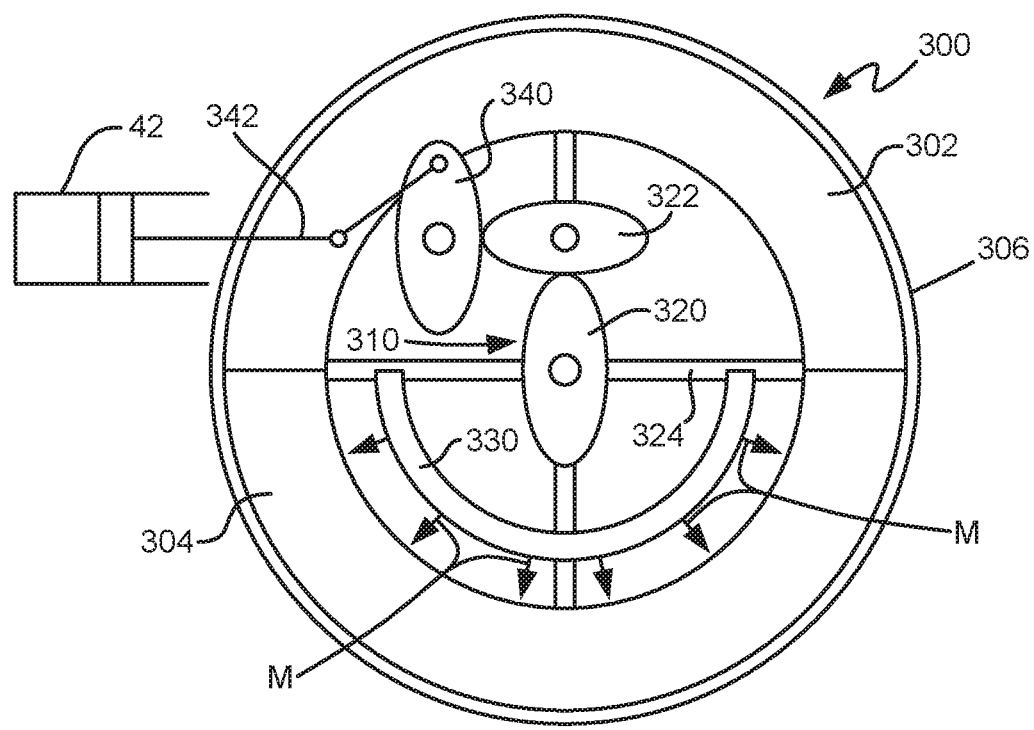
FIG. 10 provides an elevation view of the exemplary heat pump of FIG. 8 coupled to a pump.

Turning to FIG. 10, heat pump 200 is shown with pump 42, illustrated schematically. In certain exemplary embodiments, motor 28 may also be connected to pump 42 such that operation of pump 42 and head pump 300 are synchronized. For example, as shown in FIG. 10, a non-circular gear, like gears 310, may be utilized with pump 42 to synchronize operation of pump 42 with movement of regenerator housing 306 or magnet 330 during operation of heat pump 300. In such a manner, pump 42 may dwell when magnet 330 (or regenerator housing 306) is moving and pump working fluid move when magnet 330 (or regenerator housing 306) is moving. In particular, a second, out-of-phase non-circular gear 340 (or second gear set) meshed with second gear 322. Thus, second, out-of-phase non-circular gear 340 rotates at a non-constant angular velocity when motor operates to rotate second gear 322 at a constant angular velocity. In alternative exemplary embodiments, second, out-of-phase non-circular gear 340 may be fixed or mounted to the output shaft of motor 28, e.g., and rotate at a common speed with second gear 322. The second, out-of-phase non-circular gear may be coupled to piston(s) or impeller(s) of pump 42, e.g., via linkages 342, in order to regulate reciprocation of pump 42 and thereby synchronize operation of pump 42 and heat pump 300, e.g., in the manner shown in FIG. 7. Thus, a flow rate of heat transfer fluid from pump 42 may intermittently increase and decrease during operation of pump 42.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A caloric heat pump system, comprising:
    a regenerator housing defining a chamber;
    a motor;
    a pair of non-circular gears meshed with each other, a first one of the pair of non-circular gears coupled to the regenerator housing and a second one of the pair of non-circular gears coupled to the motor, the regenerator housing rotatable with the motor through the pair of non-circular gears;
    a stage comprising caloric material positioned within the chamber of the regenerator housing; and a field generator positioned proximate to the regenerator housing, the field generator positioned so that the stage is moved in and out of a field from the field generator as the regenerator housing rotates relative to the field generator, wherein the regenerator housing is rotatable with the motor such that the stage is rotated between a proximate position closest to the field from the field generator and a remote position furthest from the field from the field generator, the shapes of the non-circular gears selected such that the stage dwells longer at the proximate and remote positions relative to intermediate positions of the stage between the proximate and remote positions, and wherein the motor is operable to rotate the second one of the pair of non-circular gears at a constant angular velocity such the first one of the pair of non-circular gears rotates at a non-constant angular velocity, the angular velocity of the first one of the pair of non-circular gears being slowest when the stage is at the proximate position or the remote position.

2. The caloric heat pump system of claim 1, wherein an angular velocity of the regenerator housing is not constant during operation of the motor.

3. The caloric heat pump system of clan 1, wherein the pair of non-circular gears is a pair of elliptical gears.

4. The caloric heat pump system of claim 1, wherein the caloric material is magneto-caloric material and the field generator is a magnet.

5. The caloric heat pump system of claim 1, wherein the motor is operable to rotate the second one of the pair of non-circular gears at a constant angular velocity such the first one of the pair of non-circular gears rotates at a non-constant angular velocity.

6. The caloric heat pump system of claim 1, further comprising:
    a first heat exchanger;
    a second heat exchanger separate from the first heat exchanger; and
    a pump for circulating a heat transfer fluid between the first and second heat exchangers and the stage.

7. The caloric heat pump system of claim 6, further comprising an additional non-circular gear meshed with one of the pair of non-circular gears, the pump coupled to the additional non-circular gear such that a flow rate of heat transfer fluid from the pump intermittently increases and decreases during operation of the pump.

8. The caloric heat pump system of claim 7, wherein the flow rate of heat transfer fluid from the pump is synchronized with rotation of the regenerator housing.

* * * * *